United States Patent [19]

Kazama

[11] Patent Number: 5,239,425
[45] Date of Patent: Aug. 24, 1993

[54] MAGNETIC HEAD FOR MAGNETO-OPTICAL RECORDING DEVICE

[75] Inventor: Toshio Kazama, Nagaoka, Japan

[73] Assignee: Alps Electric Co., Ltd., Tokyo, Japan

[21] Appl. No.: 662,669

[22] Filed: Feb. 28, 1991

[30] Foreign Application Priority Data

Feb. 28, 1990 [JP] Japan .................................... 2-48501
Feb. 28, 1990 [JP] Japan .................................... 2-48502

[51] Int. Cl.$^5$ ......................... G11B 5/02; G11B 11/00
[52] U.S. Cl. ..................................... 360/59; 360/114; 369/13
[58] Field of Search ................... 369/13; 360/59, 114, 360/110, 119, 120, 121, 125; 336/186, 187, 83; 346/74.5

[56] References Cited

U.S. PATENT DOCUMENTS

4,520,409 5/1985 Kimoto et al. ........................ 360/59
4,796,241 1/1989 Hayakawa et al. ................... 369/13
5,111,441 5/1992 Eto et al. ............................. 369/13

Primary Examiner—Robert J. Pascal
Assistant Examiner—Ali Neyzari
Attorney, Agent, or Firm—Guy W. Shoup; Patrick T. Bever

[57] ABSTRACT

A magnetic head for a magneto-optical recording device for magnetically recording information onto a magnetic recording medium under the condition where the magnetic recording medium is heated by irradiation of a laser beam. A leakage magnetic field is effectively suppressed by a skin effect, and a magnetic field due to an eddy current is effectively summed up with a magnetic field generated from the core end, thereby increasing an intensity of a total magnetic field to be applied to the magnetic recording medium. Further, a distribution of the magnetic field intensity at the core end can be easily adjusted to stably and widely apply the magnetic field to the magnetic recording medium.

8 Claims, 6 Drawing Sheets

MAGNETIC HEAD FOR MAGNETO-OPTICAL RECORDING DEVICE

BACKGROUND OF THE INVENTION

(1) Field of the Invention

The present invention relates to a magnetic head for a magneto-optical recording device employing a magnetic field modulating type recording system.

(2) Description of Related Art

In a known magneto-optical recording device employing a magnetic field modulating type recording system, information is recorded onto a magnetic recording medium by a magnetic head under the condition where the magnetic recording medium is partially heated by irradiation of a laser beam to thereby reduce a coercive force. According to such a magneto-optical recording device, vertical magnetic recording can be carried out by a relatively small magnetic field.

Referring to FIG. 12A which is a schematic illustration of the magneto-optical recording device in the prior art, reference numeral 1 designates a magnetic recording medium. The magnetic recording medium 1 is constructed of a substrate 2 (e.g., polycarbonate) having a light transmissivity, a vertical magnetization film 3 (e.g., TbFeCo) formed on an upper surface of the substrate 2, and a protection film 4 (e.g., $Si_3N_4$) formed on an upper surface of the vertical magnetization film 3. A condenser lens 5 is located below the magnetic recording medium 1 to condense a laser beam L and irradiate the same upon the vertical magnetization film 3, so that an irradiated portion of the vertical magnetization film 3 is heated by the laser beam L.

A magnetic head 6 is located above the magnetic recording medium 1 to carry out vertical magnetic recording to the heated portion of the vertical magnetization film 3. The magnetic head 6 is constructed of a rod-like main pole 7 and a coil 8 wound around the main pole 7. When a recording current is supplied to the coil 8, a magnetic flux $\phi$ is generated from the magnetic head 6, thereby generating a magnetic field. As a result, the vertical magnetization film 3 is vertically magnetized by this magnetic field to thereby carry out the vertical recording.

In the magneto-optical recording device utilizing the above-mentioned principle, it is theoretically preferable that the intensity of the recording magnetic field due to the magnetic flux to be generated from a lower end of the main pole 7 becomes maximum near the vertical magnetization film 3.

However, it is necessary to define a spacing between the main pole 7 and the magnetic recording medium 1 since a hardness and a bond strength of the film surface of the magnetic recording medium 1 are small.

Moreover, since the substrate 2 of the magnetic recording medium 1 is normally formed of a soft material such as a synthetic resin, a rigidity of the substrate 2 is low, and a flatness of the substrate 2 is limited. Accordingly, surface vibration of the magnetic recording medium 1 during rotation thereof cannot be avoided. Therefore, the spacing between the main pole 7 and the magnetic recording medium 1 must be made large.

Further, because of the presence of this spacing and the flat shape of the end surface of the main pole 7, it is necessary to form a large magnetic field in order to realize predetermined vertical magnetization. Thus, it is impossible to sufficiently make use of the aforementioned advantage of the magneto-optical recording device such that information can be recorded by a small magnetic field.

To solve the above problem, the present applicant proposed a magnetic head 100 as shown in FIG. 12B. The magnetic head 100 is constructed of a main pole 7, a pair of return path cores 9 disposed on opposite sides (front and rear sides) of the main pole 7 in such a manner that each return path core 9 connects opposite end portions of the main pole 7, and a pair of gaps 10 interposed between the main pole 7 and the two return path cores 9, respectively. Each gap 10 is formed of a non-magnetic insulating material such as glass and $CaTiO_3$.

In the magnetic head 100, two magnetic paths passing through the two return path cores 9 are formed by the return path cores 9 disposed on the opposite sides of the main pole 7, thereby increasing a magnetic flux density at the end portion of the main pole 7 in the vicinity of the magnetic recording medium 1 to widely generate a uniform magnetic field to be applied to the magnetic recording medium 1.

The construction of the magnetic head 100 having the two return path cores 9 on the opposite sides of the main pole 7 as shown in FIG. 12B is an example in the prior art. As another example like the above construction, it is known that a magnetic head is constructed of a main pole 7, a single return path core 9 disposed on one side of the main pole 7, and a single gap 10 interposed between the main pole 7 and the return path core 9.

In this construction of the magnetic head having the single return path core 9, the same operation as in the magnetic head having the two return path cores 9 is obtained with the exception that a range of application of the magnetic field is smaller than that in the magnetic head having the two return path cores 9.

Although not especially shown, each of the magnetic heads shown in FIGS. 12A and 12B is fixed to a slider for defining a given spacing between the magnetic head and the magnetic recording medium 1.

As mentioned above, the magnetic head 100 is provided with the two gaps 10 formed of a non-magnetic insulating material, each being interposed between the main pole 7 and the return path core 9. However, as a leakage magnetic field Hg leaking from the main pole 7 to each gap 10 is large, a large magnetomotive force is required so as to enlarge a magnetic field to be generated from the core end.

In a magnetic head for audio equipments, a spacer formed of a non-magnetic conductive material such as Cu and Ti is inserted in each gap 10 to generate an eddy current and accordingly generate a magnetic field He due to the eddy current so as to suppress the leakage magnetic field Hg to each gap 10 and relatively enlarge the magnetic field to be generated from the core end.

That is, the eddy current is generated in such a direction as to suppress the leakage magnetic field Hg. In other words, the eddy current is generated in such a direction as to generate the magnetic field He directed counter to the leakage magnetic field Hg. As a result, while an eddy current loss is generated, the magnetic field He due to the eddy current is synthesized with the magnetic field generated from the core end to thereby increase the intensity of the total magnetic field to be generated from the magnetic head.

However, in the case that this method is applied to a magnetic field modulating type magnetic head, there is a problem such that since a cross sectional area in each gap 10 is small as compared with that in the magnetic head for audio equipments, the effect of suppressing the leakage magnetic field Hg, that is, a "skin effect" indicating a degree of penetration of a high-frequency electromagnetic wave upon incidence thereof on the spacer becomes relatively small. As a result, it is difficult to increase the total magentic field to be generated from the magnetic head by synthesizing the magnetic field He due to the eddy current with the magnetic field generated from the core end.

Further, as the magnetic field He due to the eddy current is locally generated, a distribution of the magnetic field at the core end cannot be generally improved. Therefore, it has been demanded to effectively improve the distribution of the magnetic field at the core end.

SUMMARY OF THE INVENTION

It is a first object of the present invention to provide a magnetic head for a magneto-optical recording device which can effectively suppress the leakage magnetic field Hg by the skin effect and effectively synthesize the magnetic field He due to the eddy current with the magnetic field generated from the core end, thereby increasing the intensity of the total magnetic field to be applied to the magnetic recording medium.

It is a second object of the present invention to provide a magnetic head for a magneto-optical recording device which can easily adjust the distribution of the magnetic field intensity at the core end and stably and widely apply the magnetic field to the magnetic recording medium.

According to a first aspect of the present invention, there is provided a magnetic head for a magneto-optical recording device for magnetically recording information onto a magnetic recording medium under the condition where said magnetic recording medium is heated by irradiation of a laser beam, said magnetic head comprising a main pole around which a coil is wound, a return path core provided so as to connect opposite end portions of said main pole, a gap provided between said main pole and said return path core, and a magnetic conductive spacer provided in said gap.

With this construction of the first aspect, by the provision of the magnetic conductive spacer in the gap (e.g., at a position contacting with the main pole) between the main pole and the return path core, a skin depth (depending on a specific resistance and a magnetic permeability in the case that a frequency is fixed; which will be hereinafter described in the Description of the Preferred Embodiments) representing the skin effect can be set to a small value.

According to a second aspect of the present invention, there is provided a magnetic head for a magneto-optical recording device for magnetically recording information onto a magnetic recording medium under the condition where said magnetic recording medium is heated by irradiation of a laser beam, said magnetic head comprising a main pole around which a coil is wound, a return path core provided so as to connect opposite end portions of said main pole, a gap provided between the end portion of said main pole in the vicinity of said magnetic recording medium and said return path core, and a conductor provided at the end portion of said main pole in the vicinity of said magnetic recording medium.

With this construction of the second aspect, by the provision of the conductor at the end portion of the main pole in the vicinity of the magnetic recording medium, a magnetic field can be generated by the eddy current flowing in the conductor. The magnetic field due to the eddy current is directed so as to suppress the magnetic field generated from the core end inside the conductor and enhance the magnetic field generated from the core end outside the conductor.

Further, by forming a given circuit pattern in the conductor, the distribution of the intensity of the magnetic field to be generated by the main pole and the return path core can be optimally adjusted.

According to a third aspect of the present invention, there is provided a magnetic head for a magneto-optical recording device for magnetically recording information onto a magnetic recording medium under the condition where said magnetic recording medium is heated by irradiation of a laser beam, said magnetic head comprising a main pole around which a coil is wound, a return path core provided so as to connect opposite end portions of said main pole, a gap provided between the end portion of said main pole in the vicinity of said magnetic recording medium and said return path core, a conductor provided at the end portion of said main pole in the vicinity of said magnetic recording medium, and a conductive spacer provided in said gap.

With this construction of the third aspect, by the provision of the conductive spacer in the gap between the end portion of the main pole in the vicinity of the magnetic recording medium and the return path core, the leakage magnetic field leaking from the main pole into the gap can be suppressed to thereby relatively improve the intensity of the magnetic field due to the eddy current flowing in the spacer passing through the gap from the outside.

That is, the distribution of the magnetic field intensity described in the second aspect of the present invention can be adjusted in addition to the magnetic field due to the eddy current flowing in the spacer.

Other objects and features of the invention will be more fully understood from the following detailed description and appended claims when taken with the accompanying drawings.

DETAILED DESCRIPTION OF THE PREFERRED EMBODIMENTS

There will now be described a preferred embodiment according to the first aspect of the present invention with reference to FIGS. 1A to 7B.

Figure 12A:
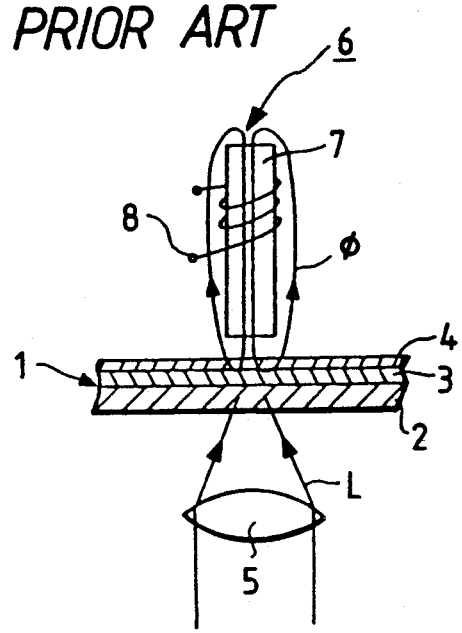
FIG. 12A is a schematic illustration of a magneto-optical recording device in the prior art, showing the operation of a magnetic field from the magnetic head to the magnetic recording medium.
Figure 12B:
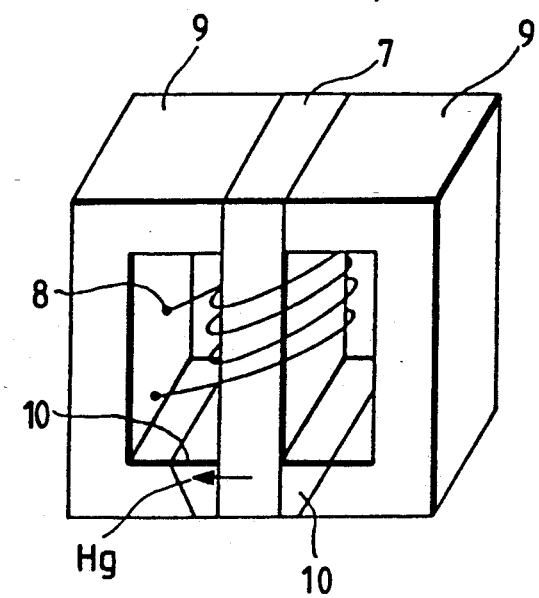
FIG. 12B is a perspective view of the magnetic head employing the two return path cores in the prior art.

As shown in the drawings, a magnetic head 101 in the preferred embodiment has a basic construction common to that of the magnetic head 100 in the prior art shown in FIG. 12B. Accordingly, in the following description, the common parts are designated by the same reference numerals as those shown in FIG. 12B, and the explanation thereof will be hereinafter simplified.

Figure 1A:
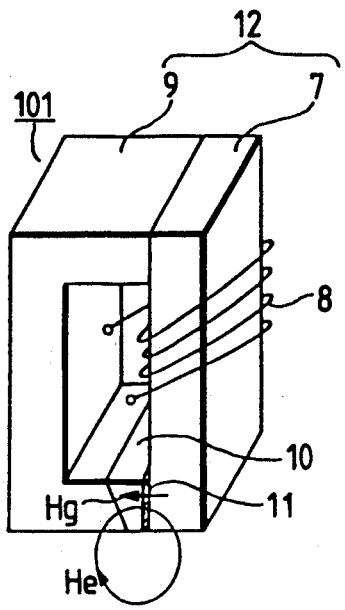
FIG. 1A is a perspective view of a magnetic head provided with a single return path core according to the first aspect of the present invention.
Figure 2:
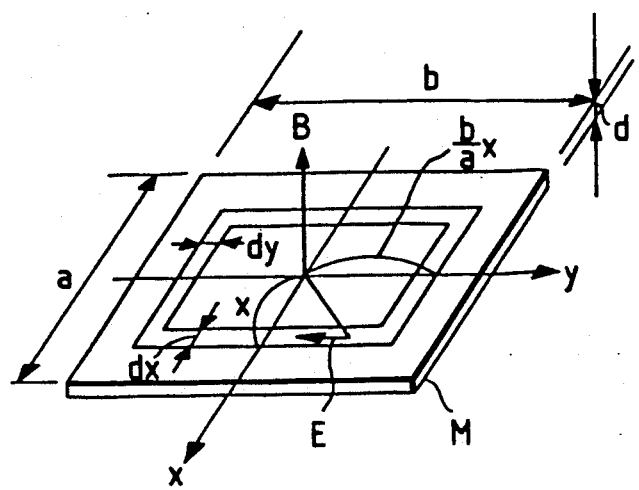
FIG. 2 is a perspective view of a spacer shown in FIGS. 1A and 1B, explaining an eddy current loss.

Referring now to FIG. 1A, reference numeral 11 designates a spacer located in a gap 10 between a main pole 7 and a return path core 9 at a position contacting with the main pole 7. The spacer 11 is formed of a material having a relatively small specific resistance (about $10^{-6}$-$10^{-7}$ $\Omega \cdot m$) and having a relatively large magnetic permeability.

For instance, such a material for the spacer 11 may include pure iron, silicon steel, Permendur, and 45-25 Perminver (which will be hereinafter described).

Although the return path core 9, the gap 10, and the spacer 11 are provided on one side of the main pole 7 in the above preferred embodiment, the structure of the magnetic head 101 according to the first aspect of the present invention is not limited to the above structure. For example, the return path core 9, the gap 10 and the spacer 11 may be provided on opposite sides of the main pole 7.

Figure 1B:
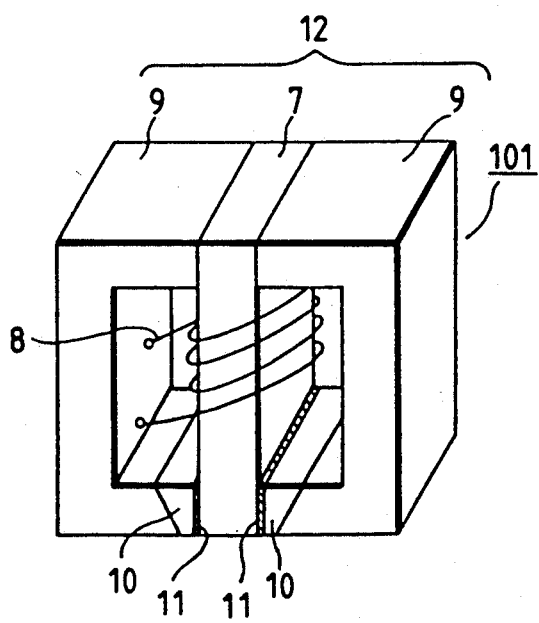
FIG. 1B is a perspective view of a magnetic core provided with a pair of return path cores according to the first aspect of the present invention.

That is, as shown in FIG. 1B corresponding to FIG. 12B showing the prior art, a pair of return path cores 9 may be located on opposite sides of the main pole 7, and a pair of gaps 10 may be located between the main pole 7 and the return path cores 9, respectively. Further, a pair of spacers 11 formed of a material having a relatively small specific resistance and a relatively large magnetic permeability may be located in the two gaps 10 at opposite positions contacting the main pole 7, respectively.

In the following description, an assembly of the main pole 7 and the return path core or cores 9 will be referred to as a magnetic core 12.

The advantages to be obtained by the provision of the spacer 11 in the gap 10 will now be described.

The following description will be directed individually to (1) eddy current loss to be generated in the spacer 11 in the gap 10, (2) skin effect (skin depth), (3) magnetic permeability, (4) select condition for an optimum material to be selected as the spacer 11, and (5) relationship among specific resistance $\rho$, magnetic permeability $\mu$, and skin depth $\delta$ of typical materials.

(1) Eddy Current Loss

It is assumed that a material M as the spacer 11 having a specific resistance $\rho$, a magnetic permeability $\mu$ and a size of a (length) x b (width) x d (thickness), and that a magnetic flux density B is perpendicular to an x-y plane, which magnetic flux density B is being sinusoidally oscillated with a period $\omega t$.

Further, the magnetic flux density B is uniform in the material M.

Considering a current path similar to the rectangle ab on the material M, a magnetic flux $\phi$ in a region surrounded by the current path is expressed as follows:

$$\phi = B \cdot S = 4b/a \cdot x^2 B_0 \sin \omega t \quad (1)$$

where S represents a surface area of the region in the current path.

A voltage e to be generated in the current path is expressed as follows:

$$e = -d\phi/dt = -4b/a \cdot x^2 \omega B_0 \cos \omega t \quad (2)$$

Letting L denote a length of the current path and E denote an electric field, the voltage e is expressed as follows:

$$e = L \cdot E = 4(1 + b/a)x \cdot E \quad (3)$$

Therefore, an eddy current density i is expressed according to the Ohm's law as follows:

$$i = E/\rho = -\frac{\omega b x B_0 \cos \omega t}{(a + b)\rho} \quad (4)$$

That is, the eddy current density to be induced in the material M has a direction counter to that of an electric current flowing in the current path equivalent to the magnetic flux density B, and it decreases with a decrease in distance to a center axis of the material M.

An effective value V of an electromotive force to be generated along the current path is expressed according to Equation (2) as follows:

$$V = |e|/2^{1/2} = \frac{2(2)^{1/2}\omega b x^2 B_0}{a} \quad (5)$$

An electric resistance R of the current path having minute thicknesses dx and dy ($=(b/a)dx$) is expressed as follows:

$$R = \rho\left[\frac{2 \cdot (b/a)x}{d \cdot dx} + \frac{2x}{2 \cdot (b/a)dx}\right] \quad (6)$$
$$= 2\rho \cdot \frac{(b/a + a/b)x}{d \cdot dx}$$

Therefore, an eddy current loss W is expressed as follows:

$$W = \int_0^{a/2} V^2/R = \frac{\pi^2 f^2 a^3 d B_0^2}{4(a^2 + b^2)\rho} \quad (7)$$

(2) Skin Effect

The influence of eddy current includes (i) heat generation based on an eddy current loss and (ii) skin effect.

The skin effect is a phenomenon such that a magnetic flux generated by the eddy current cancels an original magnetic flux (i.e., a leakage magnetic field Hg to be hereinafter described) to result in suppression of a magnetic flux change.

Figure 3A:
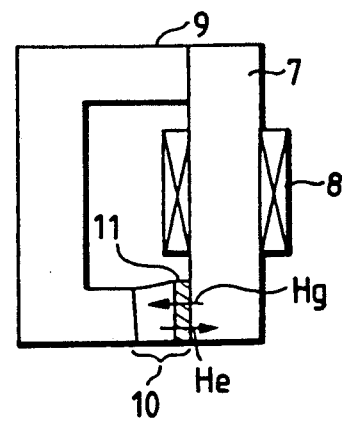
FIG. 3A is a schematic elevational view of the magnetic head shown in FIG. 1A, explaining a skin depth.
Figure 3B:
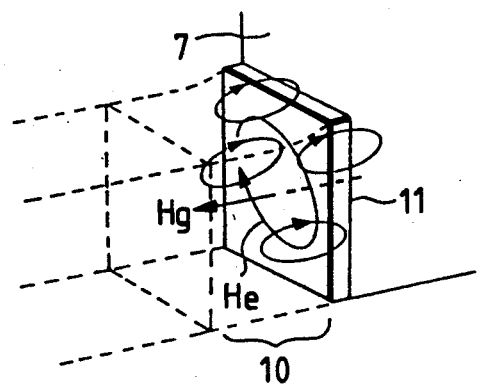
FIG. 3B is a perspective view of the spacer provided in the gap of the magnetic head shown in FIG. 3A.

The skin effect will now be described in detail with reference to FIGS. 3A and 3B. An eddy current is generated in the gap 10 by the leakage magnetic field Hg directed to the gap 10. The eddy current is generated in a direction hindering the leakage magnetic field Hg, that is, in a direction generating a magnetic field He directed counter to the leakage magnetic field Hg. As a result, the leakage magnetic field Hg is suppressed by the magnetic field He.

Accordingly, a synthetic magnetic field H in the gap 10 is expressed as follows:

$$H = Hg - He$$

The synthetic magnetic field H can be also expressed as a function of a position on the spacer 11. In this case, the synthetic magnetic field H becomes maximum ($=Hg$) at the outermost periphery of the spacer 11, and decreases with a decrease in distance to the center of the spacer 11.

Considering a certain position on the spacer 11 where the synthetic magnetic field H becomes 1/e times the leakage magnetic field Hg, a distance $\delta$ from the outermost periphery of the spacer 11 (see FIG. 4A) is expressed as follows:

$$\delta = [\rho/(\pi f \mu)]^{\frac{1}{2}} \quad (8)$$

Figure 4A:
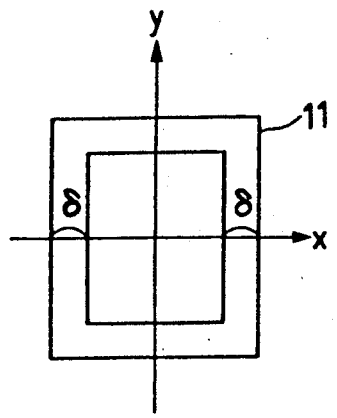
FIG. 4A is a schematic side view of the spacer, theoretically explaining the skin depth.
Figure 4B:
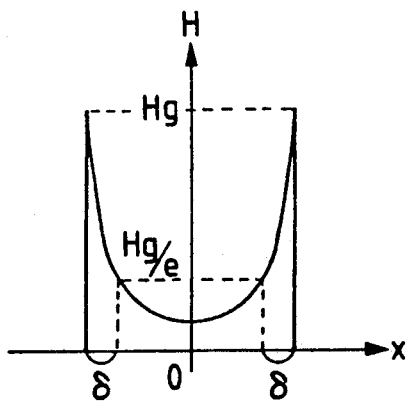
FIGS. 4B and 4C are graphs for theoretically explaining the skin depth in relation to FIG. 4A.
Figure 4C:
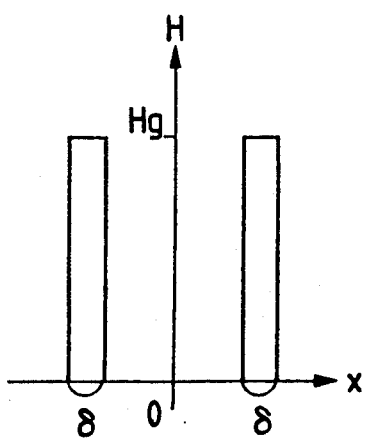

In this case, a distribution of a magnetic field intensity is shown in FIG. 4B.

From calculation or as will be understood from the distribution of the magnetic field intensity shown in FIG. 4B, it can be generally considered that $H = Hg$ holds in the outer region at the distance $\delta$ inwardly from the outermost periphery of the spacer 11, and that $H = 0$ holds in the inner region inside the above outer region. In this regard, the distribution of the magnetic field intensity can be regarded as being shown in FIG. 4C.

In other words, while there exists the leakage magnetic field Hg in the outer region at the distance $\delta$ inwardly from the outermost periphery of the spacer 11, the leakage magnetic field Hg becomes zero in the inner region inside the above outer region. Accordingly, it is understood that the smaller the distance $\delta$, the more easily the leakage magnetic field Hg is suppressed. Thus, the suppression of the leakage magnetic field Hg is caused by the "skin effect (phenomenon such that when an electromagnetic wave is incident on a conductor, it penetrates into the conductor till a certain depth thereof)", and the distance $\delta$ is called a "skin depth".

Figure 5:
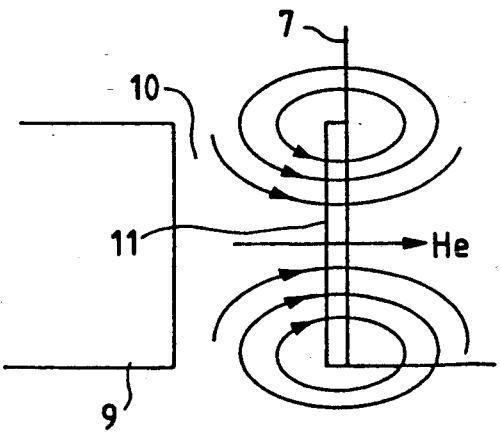
FIG. 5 is a schematic illustration of a magnetic field generated from the spacer.

As shown in FIG. 5, the magnetic field generated by the eddy current is distributed also outside the spacer 11.

The magnitude of the magnetic field generated outside the spacer 11 increases with an increase in magnitude of the magnetic field He due to the eddy current, that is, a decrease in the skin depth $\delta$. The magnetic field generated outside the spacer 11 is synthesized with an original magnetic field from the magnetic core 12 to obtain a large synthetic magnetic field.

In comparison with the conventional magnetic head 100 which does not include the spacer 11, the magnetic head 101 including the spacer 11 according to the present invention is advantageous in respect of the same magnetomotive force because the leakage magnetic field Hg can be suppressed to thereby obtain a large magnetic field intensity.

(3) Magnetic Permeability

In case of considering copper as the material for the spacer 11, the skin depth $\delta$ becomes 66 $\mu$m (frequency f: 1 MHz).

The value of 66 $\mu$m is relatively large in the case that a pole width of the magnetic head 101 is set to 200 $\mu$m. Accordingly, the effect of suppressing the leakage magnetic field Hg is not almost exhibited.

Copper is one of the materials having the smallest specific resistance $\rho$, and as apparent from Equation (8), it is impossible to further reduce the skin depth $\delta$ from the viewpoint of the specific resistance even if any other non-magnetic conductors are used.

Then, the magnetic permeability $\mu$ as the second factor shown in Equation (8) is considered.

Figure 6:
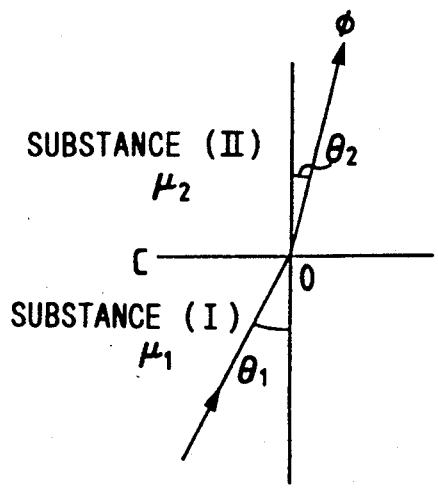
FIG. 6 is a schematic illustration for explaining refraction of a magnetic flux due to a different in magnetic permeability.

Supposing two substances I and II partitioned by a boundary C as shown in FIG. 6, when a magnetic flux $\phi$ passes through the boundary C from the substance I to the substance II (at a point 0 of intersection between the magnetic flux $\phi$ and the boundary C), the magnetic flux $\phi$ is refracted at the point 0 because of a difference between a magnetic permeability $\mu_1$ of the substance I and a magnetic permeability $\mu_2$ of the substance II.

Letting $\theta_1$ and $\theta_2$ denote refraction angles in the substances I and II, respectively, the following equation holds.

$$\tan\theta_1/\tan\theta_2 = \mu_1/\mu_2 \quad (9)$$

Considering the substances I and II as being the material for the core (the main pole 7) and the material for the spacer 11, respectively, it is preferable that the refraction angle $\theta_2$ becomes as small as possible, so as to effectively generate an eddy current in the spacer 11.

That is, it is preferable that the magnetic flux $\phi$ refracted at the angle $\theta_2$ with respect to the boundary C between the substances I and II is to be directed perpendicularly to the boundary C, so that the eddy current to be generated resultantly may become parallel to the boundary C.

Assuming that the eddy current is generated in a plane parallel to the boundary C, the magnitude of the eddy current is proportional to cos $\theta_2$. If the magnitude of the eddy current has a permissible minimum value 0.8 times a maximum value (to be obtained when the magnetic flux is incident perpendicularly upon the spacer 11), the range of cos $\theta_2 \geq 0.8$, that is, the range of $\theta_2 \geq 37°$ is set. Further, considering the worst case such that the incident angle $\theta_1$ of the magnetic flux into the spacer 11 is 70° at the maximum (i.e., considering $\theta_1 = 70°$ and $\theta_2 = 37°$), $\mu_1/\mu_2 = 3.7$ is given from Equation (9), and $\mu_2 = 0.27\ \mu_1$ is therefore given.

This value is an upper limit of the magnetic permeability of the material to be selected for the spacer 11. In the case that the substance I is ferrite, $\mu_1 = 3000\ \mu_0$ ($\mu_0$: magnetic permeability in vacuum) is given, provided that the frequency f is 1 MHz. Therefore, it is understood that the material satisfying the condition of $\mu_2 \leq 800\ \mu_0$ should be selected for the spacer 11.

As described above, by using a conductive magnetic material having a magnetic permeability $\mu_2$ satisfying the condition of $\mu_2 \leq 0.27\ \mu_1$ as the material for the spacer 11, and eddy current can be effectively generated.

(4) Relationship between Skin Depth $\delta$ and Magnetic Permeability $\mu$ ($\mu_2$)

It is considered that the thickness of the main pole 7 is set to 0.2 mm, and that the skin depth $\delta$ is set to 10% or less of 0.2 mm. From Equation (8) (i.e., $\delta = [\rho/(\pi f \mu)]^{\frac{1}{2}}$) with the frequency f of 1 MHz, $\rho/\mu \leq 1.6 \times 10^{-9}$ ($\Omega \cdot$m) is given. There exists no non-magnetic conductive material ($\mu = 1$) satisfying this condition (at ordinary temperature).

Even in case of silver having the smallest specific resistance $\rho$ at ordinary temperature, the value of $\rho/\mu$ becomes $1.6 \times 10^{-8}$ ($\Omega \cdot$m), which does not satisfy the above condition of $\rho/\mu \leq 1.6 \times 10^{-9}$ ($\Omega \cdot$m).

That is, in order to satisfy the condition that the skin depth $\delta$ should be 10% or less of the thickness (0.2 mm) of the main pole 7, the magnetic permeability must satisfy at least the condition of $\mu \geq 10\ \mu_0$.

However, since the specific resistance $\rho$ depends on the kind of substance, the lower limit of $\mu$ varies with the specific resistance $\rho$ (the above value of the skin depth $\delta$ set to 10% or less of the thickness of 0.2 mm is one example).

(5) Relationship among Specific Resistance $\rho$, Magnetic Permeability $\mu$ and Skin Depth $\delta$ of Typical Materials In the following table are shown a specific resistance $\rho$, relative magnetic permeability $\mu/\mu_0$ and skin depth $\delta$ (frequency f=1 MHz) of copper (non-magnetic conductive material), pure iron, silicon steel, Permendur and 45-25 Perminver (magnetic conductive material) as typical materials.

TABLE

| | $\rho$ ($\Omega \cdot$m) | $\mu/\mu_0$ | $\delta$ ($\mu$m) |
|---|---|---|---|
| Copper | $1.72 \times 10^{-8}$ | 1 | 66 |
| Pure Iron | $9.8 \times 10^{-8}$ | 300 | 9 |
| Silicon Steel | $6 \times 10^{-7}$ | 500 | 17 |
| Permendur | $7 \times 10^{-8}$ | 800 | 5 |
| 45-25 Perminver | $1.9 \times 10^{-7}$ | 400 | 11 |

As apparent from the above table, the skin depth and the magnetic permeability of the materials except copper satisfy the conditions of $\delta \leq 20\ \mu$m and $\mu \leq 800\ \mu_0$, respectively. Therefore, in the case of using an MnZn ferrite magnetic pole having a thickness of 0.2 mm as the main pole 7 and using any one of the above materials satisfying the above conditions as the spacer 11 in the gap 10, the leakage magnetic field Hg can be suppressed to thereby relatively enhance the magnetic field due to the eddy current. The magnetic field due to the eddy current is synthesized with the magnetic field generated from the end of the magnetic core 12, thus increasing the intensity of the total magnetic field to be applied to the magnetic recording medium 1.

Figure 7A:
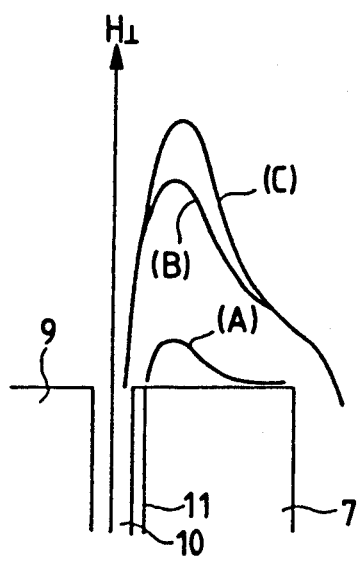
FIG. 7A is a graph showing a distribution of a magnetic field due to an eddy current, a magnetic field generated from a magnetic core, and a synthetic magnetic field obtained by summing up these magnetic fields in the magnetic head shown in FIG. 1A.
Figure 7B:
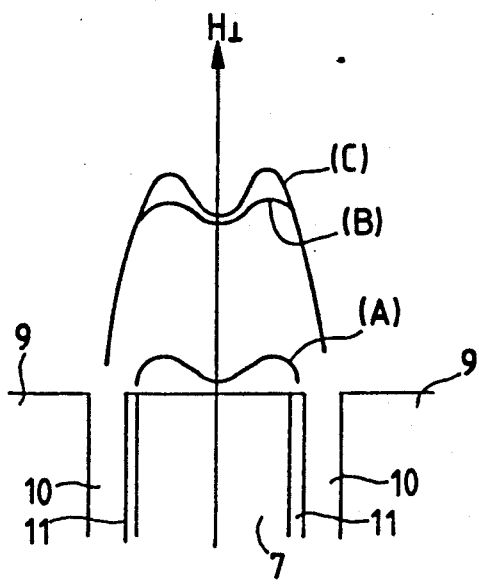
FIG. 7B is a graph similar to FIG. 7A, in the magnetic head shown in FIG. 1B.

The above effect will be described more specifically with reference to FIGS. 7A and 7B. FIG. 7A shows a magnetic field to be generated from a magnetic head having one gap 10 corresponding to FIG. 1A, while FIG. 7B shows a magnetic field to be generated from a magnetic head having two gaps 10 corresponding to FIG. 1B. In both the constructions of FIGS. 7A and 7B, the leakage magnetic field Hg is suppressed to thereby relatively enhance the magnetic field (shown by a curved line A) due to the eddy current. The magnetic field due to the eddy current is synthesized with the magnetic field (shown by a curved line B) generated from the end of the magnetic core 12. As a result, the intensity of the synthetic magnetic field (shown by a curved line C) from the magnetic head is totally increased, thereby effecting writing of information to the magnetic recording medium 1 with a low power consumption.

Further, as the specific resistance $\rho$ of the magnetic conductive material is larger by one to two orders than that of the non-magnetic conductive materials, the eddy current loss can be reduced by one to two orders in the magnetic conductive material as understood from Equation (7).

In the case that an upper limit of the eddy current loss is suppressed to 10% or less of a power consumption of the magnetic head 101, the thickness d of the spacer 11 can be calculated to d=4.5 $\mu$m or less from Equation (7), i.e., $$W = \int_0^{a/2} V^2/R = \frac{\pi^2 f^2 a^3 d B_0^2}{4(a^2 + b^2)\rho} \tag{7}$$

under the conditions where the power consumption of the magnetic head 101 is 0.3 W; a maximum operating frequency is 5 MHz; a surface area of the gap is 0.2×0.3 mm$^2$; a leakage magnetic flux density in the gap is 0.08 T; and the material of the spacer 11 is a pure iron.

In case of using a silicon steel instead of the pure iron, a permissible upper limit of the thickness of the spacer 11 can be increased up to 27 $\mu$m because the specific resistance $\rho$ is relatively increased.

In this case, the thickness of the spacer 11 is adjusted to about 20 $\mu$m by rolling or the like, and thereafter the spacer 11 is inserted into the gap 10. Thus, the step of manufacturing the magnetic head can be simplified because of no need of sputtering or the like.

As described above, by using the magnetic conductive material such as pure iron, silicon steel, Permendur and 45-25 Perminver as the spacer 11 in the gap 10, the effects of the above preferred embodiment are summarized as follows:

(1) A leakage magnetic field into the gap 10 can be suppressed by the skin effect. Conversely saying, a magnetic flux quantity to be applied to the magnetic recording medium 1 can be increased.

(2) An eddy current loss can be reduced in comparison with the case of using a non-magnetic conductive material as the spacer.

(3) By arbitrarily selecting any one of the magnetic conductive materials having different specific resistances $\rho$, the thickness d of the spacer 11 can be arbitrarily set. That is, a degree of freedom of designing and working can be increased. (For instance, the optimum material to be selected as the spacer 11 satisfies both the condition of $\mu_2 \leq 800 \, \mu_0$ in the case of using MnZn ferrite ($\mu_1 = 3000 \, \mu_0$) as the main pole 7 and permitting $\theta_1 = 70°$ and $\theta_2 = 37°$, and the condition of $\mu_{2min} = 10 \, \mu_0$ in relation to the condition that the skin depth $\delta$ is 10% or less of the thickness of the main pole 7 to result in $\rho/\mu_2 \leq 1.6 \times 10^{-9}$).

There will now be described a preferred embodiment according to the second aspect of the present invention with reference to FIGS. 8A, 8B, 9A, 9B, 10A, 10B, 11A and 11B.

The magnetic head shown in these drawings has a basic construction common to that of the magnetic head 100 in the prior art shown in FIG. 12B. Accordingly, in the following description, the common parts are designated by the same reference numerals as those shown in FIG. 12B, and the explanation thereof will be hereinafter simplified.

Figure 8A:
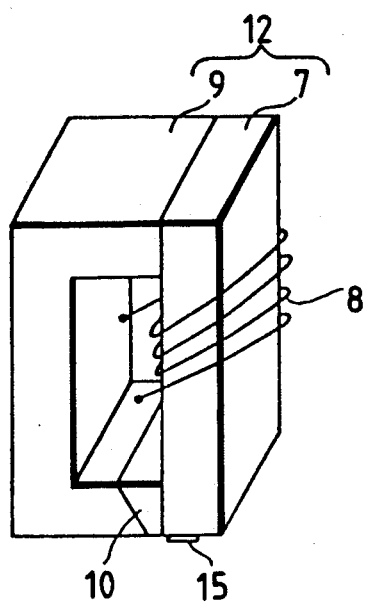
FIG. 8A is a view similar to FIG. 1A, showing a preferred embodiment according to the second aspect of the present invention.

Referring to FIG. 8A, reference numeral 15 designates a conductor provided on a lower end surface of the main pole 7.

Figure 9A:
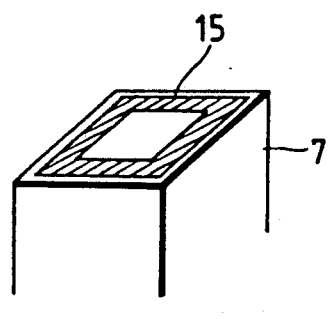
FIG. 9A is a perspective view of a circuit pattern formed in a conductor shown in FIGS. 8A to 8D.
Figure 9B:
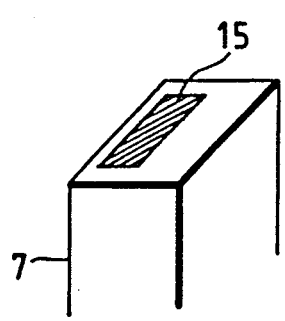
FIG. 9B is a view similar to FIG. 9A, showing a modification of the circuit pattern.

The conductor 15 is disposed at an end portion of the main pole 7 in the vicinity of the magnetic recording medium 1. As shown in FIGS. 9A and 9B which are perspective views of the conductor 15 as viewed from the lower side in FIG. 8A, the conductor 15 has given circuit patterns in which an eddy current is generated to thereby generate a magnetic field having a distribution according to the respective circuit pattern.

Figure 10A:
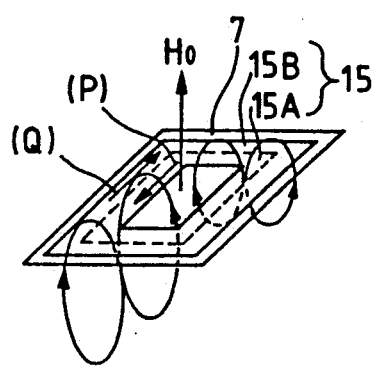
FIG. 10A is a perspective view explaining a direction of a magnetic field generated from the conductor shown in FIG. 9A.
Figure 10B:
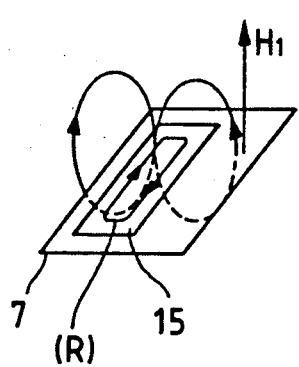
FIG. 10B is a view similar to FIG. 10A, corresponding to FIG. 9B.

More specifically, the conductor 15 having the circuit pattern shown in FIG. 9A is composed of an inside conductor portion 15A in which an eddy current flows in a direction of arrow P and an outside conductor portion 15B in which an eddy current flows in a direction of arrow Q as shown in FIG. 10A. Accordingly, a magnetic field directed by reference character $H_0$ is generated outside the circuit pattern. On the other hand, in the conductor 15 having the circuit pattern shown in FIG. 9B, an eddy current flows in a direction of arrow R as shown in FIG. 10B. Accordingly, a magnetic field directed by reference character $H_1$ is generated outside the circuit pattern.

In the case that the circuit pattern shown in FIG. 10B is formed on the magnetic core 12 shown in FIG. 8A, the magnetic field $H_1$ generated by the conductor 15 is synthesized with a magnetic field generated by the magnetic core 12 to resultantly obtain a synthetic magnetic field of a given intensity.

The circuit pattern of the conductor 15 is not limited to the circuit patterns shown in FIGS. 9A and 9B, but it may be suitably set according to a distribution of the magnetic field to be generated from the end of the core. Accordingly, the distribution of the intensity of the magnetic field can be easily adjusted so as to widely apply the magnetic field to the magnetic recording medium 1.

Although the return path core 9, the gap 10 and the conductor 15 are provided on one side of the main pole 7 in the above preferred embodiment shown in FIG. 8A, the structure of the magnetic head according to the second aspect of the present invention is not limited to the above. For instance, the return path core 9, the gap 10 and the conductor 15 may be provided on opposite sides of the main pole 7 as shown in FIG. 8B.

Figure 8B:
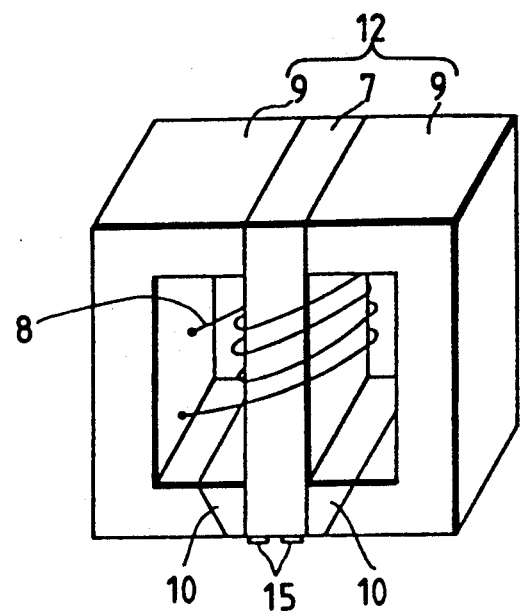
FIG. 8B is a view similar to FIG. 1B, showing another preferred embodiment according to the second aspect of the present invention.
Figure 11A:
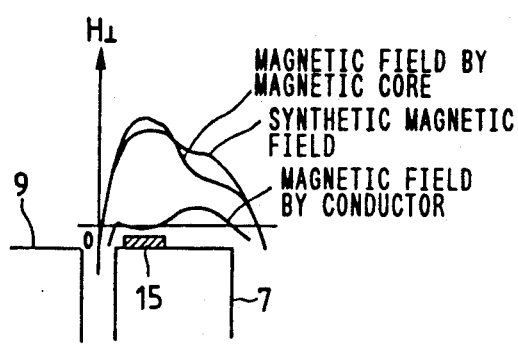
FIG. 11A is a graph showing a distribution of a magnetic field generated from the conductor, a magnetic field generated from the magnetic core, and a synthetic magnetic field obtained by summing up these magnetic fields in the magnetic head shown in FIG. 8A.
Figure 11B:
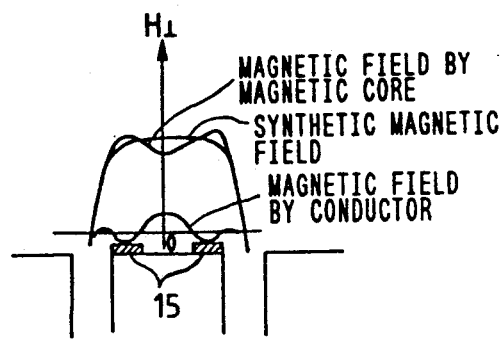
FIG. 11B is a graph similar to FIG. 11A, in the magnetic head shown in FIG. 8B.

In the preferred embodiment shown in FIG. 8B, a pair of conductors 15 each having the circuit pattern shown in FIG. 9A or 9B are disposed on the lower end surface of the main pole 7. In the same manner as in the magnetic head shown in FIG. 8A, the distribution of the intensity of the magnetic field to be generated from the magnetic head can be easily adjusted by the magnetic field generated by the conductor 15 as shown in FIG. 11B. The circuit pattern of the conductors 15 in this case is, of course, not limited to the circuit patterns shown in FIGS. 9A and 9B, but it may be arbitrarily set.

The material for the conductor 15 may include a non-magnetic conductive material such as Cu and Ti, and a magnetic conductive material having a low magnetic permeability such as Fe and silicon steel.

There will now be described a preferred embodiment according to the third aspect of the present invention with reference to FIGS. 8C, 8D, 11C and 11D.

Figure 8C:
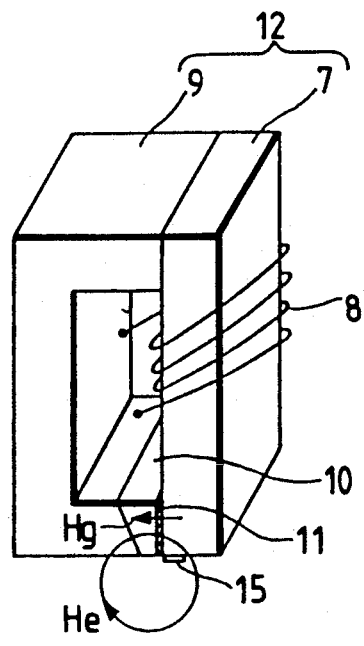
FIG. 8C is a view similar to FIG. 8A, showing a preferred embodiment according to the third aspect of the present invention.
Figure 8D:
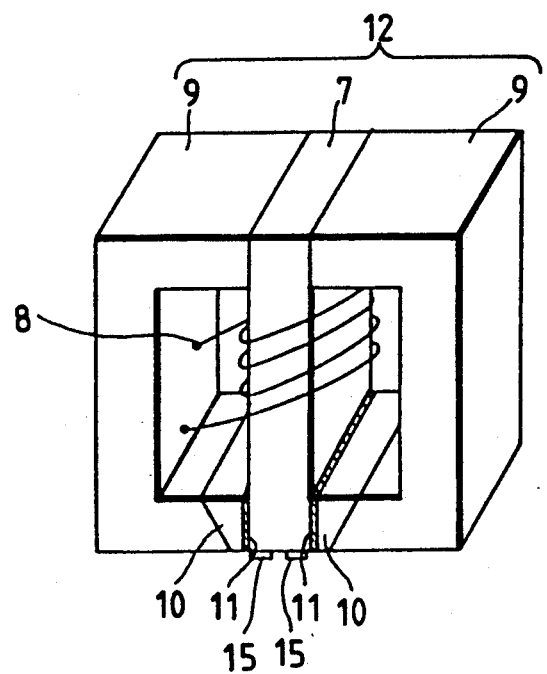
FIG. 8D is a view similar to FIG. 8B, showing another preferred embodiment according to the third aspect of the present invention.

The construction of the magnetic head shown in FIGS. 8C and 8D is different from that shown in FIGS. 8A and 8B according to the second aspect of the present invention in the point that the spacer 11 is provided in the gap 10. More specifically, the magnetic head having one return path core 9 on one side of the main pole 7 shown in FIG. 8C is provided with one spacer 11 in one gap 10, while the magnetic head having a pair of return path cores 9 on the opposite sides of the main pole 7 shown in FIG. 8D is provided with a pair of spacers 11 in a pair of gaps 10, respectively.

In both the cases of FIGS. 8C and 8D, the spacer 11 extends along the surface of the main pole 7, and it is formed of a magnetic conductive material having a low magnetic permeability such as pure iron and silicon steel. By the provision of the spacer 11, the leakage magnetic field Hg can be effectively suppressed to thereby relatively enhance the magnetic field He due tot he eddy current and improve the magnetic field to be generated from the magnetic core 12.

Figure 11C:
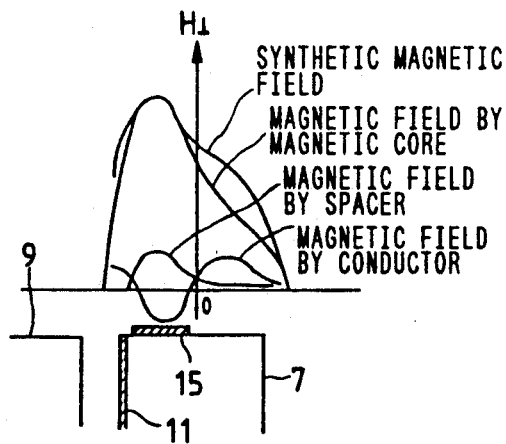
FIG. 11C is a graph showing a distribution of a magnetic field generated from the spacer, a magnetic field generated from the magnetic core, a magnetic field generated from the conductor, and a synthetic magnetic field obtained by summing up these magnetic fields in the magnetic head shown in FIG. 8C.
Figure 11D:
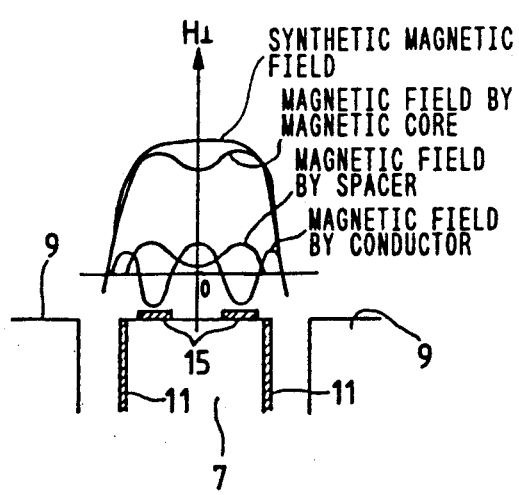
FIG. 11D is a graph similar to FIG. 11C, in the magnetic head shown in FIG. 8D.

That is, as shown in FIGS. 11C and 11D corresponding to FIGS. 8C and 8D, respectively, the distribution of the synthetic magnetic field to be generated from the magnetic head can be adjusted by the magnetic field generated by the spacer 11 in addition to the magnetic field generated by the conductor 15. Accordingly, the adjustment of the distribution of the magnetic field from the magnetic head can be more widely carried out.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A magnetic head for a magneto-optical recording device for magnetically recording information onto a magnetic recording medium under the condition where said magnetic recording medium is heated by irradiation of a laser beam, said magnetic head comprising
   a main pole around which a coil is wound,
   a return path core provided so as to connect opposite end portions of said main pole,
   a gap provided between said main pole and said return path core, and
   a magnetic conductive spacer provided on said main pole and located between said main pole and said gap.

2. A magnetic head for a magneto-optical recording device for magnetically recording information onto a magnetic recording medium under the condition where said magnetic recording medium is heated by irradiation of a laser beam, said magnetic head comprising
   a main pole around which a coil is wound, said main pole having a first end portion disposed adjacent said magnetic recording medium,
   a return path core provided so as to connect said first end portion and an opposite end portion of said main pole,
   a gap provided between the first end portion of said main pole and said return path core, and
   a conductor provided on the first end portion of said main pole facing said magnetic recording medium.

3. A magnetic head for a magneto-optical recording device for magnetically recording information onto a magnetic recording medium under the condition where said magnetic recording medium is heated by irradiation of a laser beam, said magnetic head comprising
   a main pole around which a coil is wound, said main pole having a first end portion disposed adjacent said magnetic recording medium,
   a return path core provided so as to connect said first end portion and an opposite end portion of said main pole,
   a gap provided between the first end portion of said main pole and said return path core,
   a conductor provided on the first end portion of said main pole facing said magnetic recording medium, and
   a conductive spacer provided on said main pole and located between said main pole and said gap.

4. A magnetic head of claim 1 wherein said spacer comprises a material having a specific resistance greater than $10^{-6}$ $\Omega$·m, a magnetic permeability less than or equal to 800 $\mu_0$, where $\mu_0$ is magnetic permeability in a vacuum, and a skin depth less than or equal to 20 $\mu$m.

5. A magnetic head of claim 4 wherein said material is one of pure iron, silicon steel, Permendur and 45-25 Perminver.

6. A magnetic head of claim 2 wherein said conductor comprises one of Cu and Ti, and one of Fe and silicon steel.

7. A magnetic head of claim 3 wherein said spacer comprises a material having a specific resistance greater than $10^{-6}$ $\Omega$·m, a magnetic permability less than or equal to 800 $\mu_0$, where $\mu_0$ is magnetic permeability in vacuum, and a skin depth less than or equal to 20 $\mu$m.

8. A magnetic head of claim 7 wherein said material is one of pure iron, silicon steel, Permendur and 45-25 Perminver, and said conductor comprises one of Cu and Ti, and one of Fe and silicon steel.

* * * * *